(12) United States Patent
Wang et al.

(10) Patent No.: US 10,713,820 B2
(45) Date of Patent: Jul. 14, 2020

(54) SYSTEM AND METHOD FOR ADJUSTING BRIGHTNESS IN MULTIPLE IMAGES

(71) Applicant: SHANGHAI XIAOYI TECHNOLOGY CO., LTD., Shanghai (CN)

(72) Inventors: Kongqiao Wang, Beijing (CN); Junzhou Mou, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 147 days.

(21) Appl. No.: 15/214,619

(22) Filed: Jul. 20, 2016

(65) Prior Publication Data
US 2018/0005410 A1 Jan. 4, 2018

(30) Foreign Application Priority Data
Jun. 29, 2016 (CN) .......................... 2016 1 0496593

(51) Int. Cl.
*G06T 11/00* (2006.01)
*G06T 5/50* (2006.01)
*G06T 3/40* (2006.01)
*G06T 11/60* (2006.01)

(52) U.S. Cl.
CPC .......... *G06T 11/001* (2013.01); *G06T 3/4038* (2013.01); *G06T 5/50* (2013.01); *G06T 11/60* (2013.01)

(58) Field of Classification Search
CPC ............................... G06T 11/001; G06T 11/60
See application file for complete search history.

(56) References Cited

U.S. PATENT DOCUMENTS

| 6,349,153 | B1 * | 2/2002 | Teo | ........................ | G06T 3/0081 |
| | | | | | 358/450 |
| 9,838,614 | B1 * | 12/2017 | Brailovskiy | ........... | H04N 5/247 |
| 2004/0100565 | A1 * | 5/2004 | Chen | ..................... | G06T 3/4038 |
| | | | | | 348/229.1 |
| 2006/0115182 | A1 * | 6/2006 | Deng | ...................... | G06T 5/009 |
| | | | | | 382/284 |
| 2007/0159524 | A1 * | 7/2007 | Kim | ...................... | G06T 3/4038 |
| | | | | | 348/36 |
| 2010/0177982 | A1 * | 7/2010 | Hamada | .................. | G06T 5/004 |
| | | | | | 382/264 |

(Continued)

*Primary Examiner* — Barry Drennan
*Assistant Examiner* — Khoa Vu
(74) *Attorney, Agent, or Firm* — Cantor Colburn LLP

(57) ABSTRACT

A device is provided for adjusting brightness of a plurality of images each including a plurality of pixels. The device may include a memory configured to store instructions. The device may also include a processor configured to execute the instructions to determine overall luminance values of the images. The processor may also be configured to determine, from the images, a reference image and a reference overall luminance value based on the overall luminance values. The processor may further be configured to determine adjustment factors for the images based on the reference overall luminance value of the reference image, determine weighting factors for the pixels in an image to be adjusted, and adjust luminance values of the pixels in the image to be adjusted based on an adjustment factor for the image and the weighting factors for the pixels.

18 Claims, 8 Drawing Sheets

(56) References Cited

U.S. PATENT DOCUMENTS

| | | | |
|---|---|---|---|
| 2012/0314945 A1* | 12/2012 | Cha | G06T 3/4038 |
| | | | 382/167 |
| 2012/0314971 A1* | 12/2012 | Yuan | G06T 5/008 |
| | | | 382/274 |
| 2014/0307044 A1* | 10/2014 | Sharma | H04N 5/23229 |
| | | | 348/36 |
| 2015/0049215 A1* | 2/2015 | Kuang | H04N 5/2355 |
| | | | 348/231.6 |
| 2017/0345214 A1* | 11/2017 | Hung | G06T 19/006 |

\* cited by examiner

SYSTEM AND METHOD FOR ADJUSTING BRIGHTNESS IN MULTIPLE IMAGES

CROSS-REFERENCE TO RELATED APPLICATIONS

This application is based upon and claims the benefit of priority from Chinese Patent Application No. 201610496593.4, filed on Jun. 29, 2016, the disclosure of which is expressly incorporated herein by reference in its entirety.

TECHNICAL FIELD

The present disclosure generally relates to image processing technology, and more specifically to systems and methods for adjusting brightness in multiple images.

BACKGROUND

Image "stitching," that is, joining multiple images edge-to-edge to create a single combined image, has been gaining prominence in many application areas including, for example, computer vision, digital maps, satellite imaging, medical imaging, and even amateur photography. For example, to create an immersive virtual-reality experience, multiple cameras may be used to capture source images covering different parts of a scene. These source images are then stitched together, to form a 360-degree panorama that can be used in applications such as interactive panoramic movies, architectural walk-through, multi-node movies, and other applications that generate a virtual 3D environment using images acquired from the real world.

Because the source images used for panorama stitching may be generated by different imaging devices, at different times, and/or under different illumination conditions, a well-known challenge for panorama stitching is maintaining consistency in image parameters of the source images, which may exhibit differences in brightness and/or color. To solve the inconsistency issue, conventional methods adjust adjacent source images to ensure that luminance and/or chrominance histograms (indicating variations in brightness) in the overlapping regions are matched. Such adjustments can cause undesirable side effects in certain images. That is, certain images can have over-exposure or under-exposure after the adjustments.

For example, when a first image appears darker than other images, the first image must be adjusted to increase its brightness. An adjustment factor is determined for the image to be adjusted. The brightness of the image is adjusted based on the adjustment factor. In other words, the luminance value of every pixel is adjusted based on the adjustment factor. However, since the distribution of the brightness of the pixels is typically not uniform in the image, the image typically includes some areas that are darker than other areas. If the darker areas and the brighter areas of the image are both adjusted using the same adjustment factor, the brighter areas may appear over-exposed after the adjustment. Alternatively, if the first image appears brighter than other images, its brightness should be reduced. If a single adjustment factor is used to adjust the brightness of both the darker areas and brighter areas of the image, the darker areas may appear under-exposed after the adjustment. Due to these side effects, the overall quality of the stitched panorama image may be reduced. Therefore, a method that can prevent or reduce over exposure or under exposure during brightness adjustment is needed.

The disclosed systems and methods address one or more of the problems listed above.

SUMMARY

Consistent with one embodiment of the present disclosure, there is provided a device for adjusting brightness of a plurality of images each including a plurality of pixels. The device may include a memory configured to store instructions. The device may also include a processor configured to execute the instructions to determine overall luminance values of the images. The processor may also be configured to execute the instructions to determine from the images a reference image and a reference overall luminance value based on the overall luminance values. The processor may also be configured to execute the instructions to determine adjustment factors for the images based on the reference overall luminance value of the reference image, and determine weighting factors for the pixels in an image to be adjusted. The processor may further be configured to execute the instructions to adjust luminance values of the pixels in the image to be adjusted based on an adjustment factor for the image and the weighting factors for the pixels.

Consistent with another embodiment of the present disclosure, there is provided a method for adjusting brightness of a plurality of images each including a plurality of pixels. The method may include determining overall luminance values of the images. The method may also include determining from the images a reference image and a reference overall luminance value based on the overall luminance values. The method may also include determining adjustment factors for the images based on the reference overall luminance value of the reference image, and determining weighting factors for the pixels in an image to be adjusted. The method may further include adjusting luminance values of the pixels in the image to be adjusted based on an adjustment factor for the image and the weighting factors for the pixels.

Consistent with yet another embodiment of the present disclosure, there is provided a non-transitory computer-readable storage medium storing instructions that, when executed by a processor, cause the processor to perform a method for adjusting brightness of a plurality of images each including a plurality of pixels. The method may include determining overall luminance values of the images. The method may also include determining from the images a reference image and a reference overall luminance value based on the overall luminance values. The method may also include determining adjustment factors for the images based on the reference overall luminance value of the reference image, and determining weighting factors for the pixels in an image to be adjusted. The method may further include adjusting luminance values of the pixels in the image to be adjusted based on an adjustment factor for the image and the weighting factors for the pixels.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
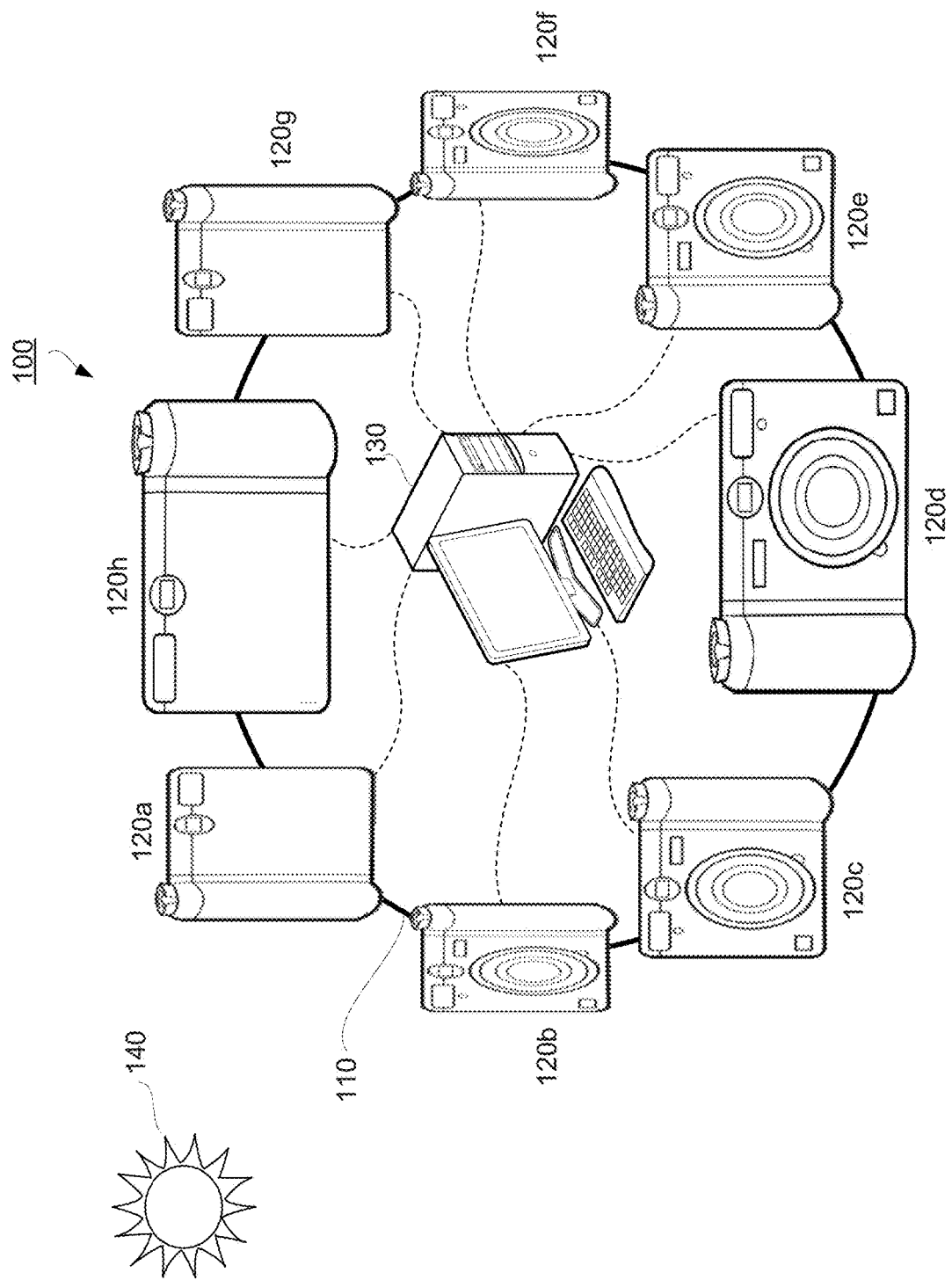
FIG. 1 is a schematic diagram illustrating an imaging system for creating panoramic images, according to an exemplary embodiment.

FIG. 1 is a schematic diagram illustrating an imaging system 100 for creating panoramic images, according to an exemplary embodiment. System 100 may include a camera rig 110, one or more cameras 120 (e.g., cameras 120a, 120b, 120c, . . . , and 120h), and a controller 130. Unless otherwise noted, the term "camera 120" should be understood to mean any or all of cameras 120a-120h.

Camera rig 110 may be a structure used for mounting cameras 120. Camera rig 110 may be built to form a specially designed camera path. Industry standard trussing and grip gear may be used in conjunction with various custom rigging solutions to allow substantial flexibility with positioning, height, and camera movement. Camera rig 110 may include complex structures that include multiple circles and curves with various diameters, straight tracks, incline/decline angles, overhead rigging, etc. Camera rig 110 may also be as simple as a single straight or curved track. For example, in 360-degree panorama photography, camera rig 110 may form a 360-degree circle for aligning cameras 120.

Camera 120 may be an image capturing device that includes any of optical devices, lenses, charge coupled devices (CCD), complementary metal-oxide-semiconductor (CMOS) detector arrays and driving circuitry, and other arrangements of optical components, electronic components, and control circuitry used in generating image data from light of various wavelengths. For example, camera 120 may be an action camera, a digital camera, a web camera, or digital single-lens reflex (DSLR) camera. Camera 120 may also be embedded in another device, such as a smartphone, a computer, a personal digital assistant (PDA), a monitoring device, a video gaming console, etc.

Camera 120 may be configured to capture one or more images of an environment in a variety of ways. As used herein, an "image" refers to, in part or in whole, a static or dynamic visual representation including, but not limited to, a photo, a picture, a graphic, a video, a hologram, a virtual reality image, an augmented reality image, other visual representations, or combinations thereof. For example, camera 120 may be configured to capture images initiated by a user, by programming, by a hardware setting, or by a combination thereof. In some embodiments, when camera 120 is configured to capture images by software or hardware programming or by a hardware setting, image capture may be performed at one or more predetermined conditions. For example, multiple cameras 120 may be controlled by controller 130 to capture images simultaneously or in an ordered fashion. Alternatively or additionally, a set of predetermined conditions, for example, the sensing of a moving object, can trigger cameras 120 to capture images. In some embodiments, capturing images may include placing cameras 120 in a mode or setting capable of capturing one or more images.

Camera 120 may include various features suitable for panorama creation. In one embodiment, camera 120 may use a 16 MP (megapixel) imaging sensor capable of capturing high-resolution (e.g., 4608×3456) photos with enhanced color and contrast. Camera 120 may have a wide field of view, such as a 155-degree viewing angle. Camera 120 may further be configured to record videos with various resolutions and frame rates, such as 1296p at 30 fps, and 1080p at 30 fps or 60 fps.

As shown in FIG. 1, in one embodiment, eight cameras 120, i.e., cameras 120a-120h, may be evenly separated and mounted on camera rig 110 to form a circle and aimed outward. The eight cameras 120 may collaborate to achieve full 360-degree panorama coverage. For example, source images taken by some or all of cameras 120 at the same time or at different points in time may be stitched together to generate a 360-degree panoramic image.

Although FIG. 1 shows system 100 to include eight cameras 120, more or fewer cameras, or even a single camera 120 may be included in system 100 for creating a panoramic image. For example, a single camera 120 may change its positions and/or orientations to capture multiple source images at different points in time. These source images may then be stitched together to form a panoramic image.

Regardless of whether the source images to be stitched are captured by different cameras at the same time or by the same camera at different points in time, different source images may have different brightness due to the diverse conditions under which each source image is taken. For example, since image capture parameters are automatically set in camera 120 for each source image depending on real-time imaging conditions of the environment, changes in illumination levels may lead to different exposure levels in adjacent source images to be stitched, yielding images where the same objects in different source images appear either brighter or darker.

For example, as shown in FIG. 1, cameras $120a$-$120h$ may be used to simultaneously capture source images $M_a$-$M_h$ (not shown) respectively, under a light source 140 (e.g., a flash unit or the sun). Source images $M_a$-$M_h$ may then be sequentially stitched to create a 360-degree panoramic image, with $M_a$ being the first source image and $M_h$ being the last source image. Cameras 120$a$ and 120$b$ may be working in backlit conditions causing source images $M_a$ and $M_b$ to show an object as darker, while cameras 120$e$ and 120$f$ are working in reflected light conditions and causing source images $M_e$ and $M_f$ to show the same object as brighter. Accordingly, in the resulted panorama, although source images ($M_a$, $M_b$) are not immediately adjacent to source images $M_e$, $M_f$, the brightness inconsistency between ($M_a$, $M_b$) and ($M_e$, $M_f$) may be significant enough to draw a viewer's attention. Moreover, in a 360-degree panorama, the first source image $M_a$ and the last source image $M_h$ also need to be stitched together, and therefore any brightness inconsistency between $M_a$ and $M_h$ may also be easily noticed.

When the brightness differences between the images are adjusted, conventional methods use a single adjustment factor to adjust luminance values for all pixels in an image. For example, the luminance values of all pixels may be increased by multiplying with a single adjustment factor. However, an image may include non-uniform brightness in different regions. For example, some regions of the image may appear brighter than other regions. Accordingly, when adjusting the brightness of the image (i.e., when adjusting the luminance values of all of the pixels included in the image) using a single adjustment factor, over-exposure can occur to some already bright regions when the image is adjusted to increase its brightness. Alternatively, under-exposure can occur to some already dark regions when the image adjusted to decrease its brightness.

To address the above-identified problems, the present disclosure provides a brightness adjusting method for achieving brightness consistency not only across some or all of the source images that form a panorama, but also across different regions in the same image by preventing or reducing over exposure and/or under exposure. That is, the disclosed methods not only ensure global brightness consistency between two adjacent source images, but also ensure local brightness consistency within an image.

In exemplary embodiments, cameras 120 may send the captured source images to an image processing device 130 (also referred to as controller 130) for further processing, including adjusting the brightness of the images, using the disclosed methods, to ensure consistency in the brightness among the images and within a certain image, and creating a panoramic image. Controller 130 may be an independent device specially designed for panorama creation. Alternatively, controller 130 may be part of another device, such as a computer. Controller 130 may be implemented through hardware, software, or a combination of hardware and software. Controller 130 may be connected to cameras 120 through a network 135 (FIG. 2) in a wired and/or wireless manner, such as through communication cables and/or a WiFi, cellular, near field communication, or infrared. Controller 130 may send control signals to cameras 120 to control the camera operation, including capturing the source images, adjusting the camera settings, etc. In some embodiments, some or all of the functions of controller 130 may be included in some or all of cameras 120, along with software to provide coordination of functions between cameras 120.

Controller 130 may also receive the captured source images and/or video frames from cameras 120, adjust the brightness of the images, and stitch these source images into panoramic images. In some embodiments, controller 130 may automatically adjust the brightness of the images upon receipt using the disclosed methods without requiring a user input.

Figure 2:
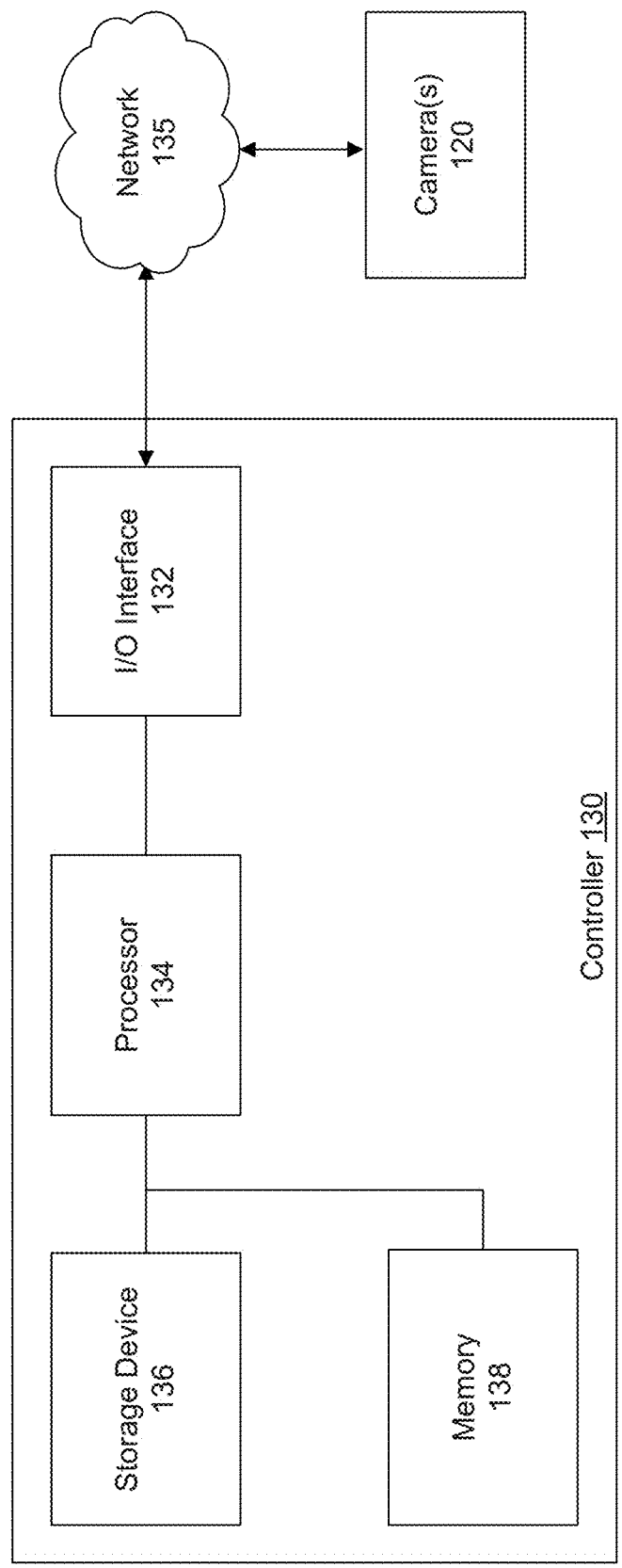
FIG. 2 is a block diagram of a controller used in the imaging system shown in FIG. 1, according to an exemplary embodiment.

FIG. 2 is a block diagram of controller 130, according to an exemplary embodiment. Controller 130 may be included in imaging system 100 shown in FIG. 1. Controller 130 may include an input/output (I/O) interface 132, a processor 134, a storage device 136, and/or a memory 138. In some embodiments, storage device 136 and/or memory 138 may not be included in controller 130, but may be included in a system that is separate from controller 130 (e.g., in a cloud storage or computing device or system).

I/O interface 132 may be configured for two-way communication between controller 130 and various devices. For example, processor 134 may send operating signals to cameras 120 through I/O interface 132. Processor 134 may receive captured images and/or video frames from cameras 120 through I/O interface 132. I/O interface 132 may communicate with cameras 120 to exchange data through network 135. Network 135 may include any type of wired or wireless network that may allow transmitting and receiving data. For example, network 135 may include a regional or nationwide cellular network, a local wireless network (e.g., Bluetooth™, near field communication, infrared, or WiFi), and/or a wired network (e.g., wired through cables).

I/O interface 132 may be configured to transmit image data received from cameras 120 through network 135 to processor 134. Processor 134 may include any appropriate type of general purpose or special-purpose microprocessor, digital signal processor, or microprocessor. Processor 134 may be configured as a separate processor module dedicated to create panoramic images. Alternatively, processor 134 may be configured as a shared processor module for performing other functions unrelated to panorama creation. Processor 134 may execute computer instructions (program code) and perform functions in accordance with techniques described herein. Computer instructions include routines, programs, objects, components, data structures, procedures, modules, and functions.

Storage device 136 and/or memory 138 may be configured to store the instructions and/or data used for creating panoramic images. Storage device 136 and/or memory 138 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, or a hard disk.

Storage device 136 and/or memory 138 may be configured to store the computer instructions and data that may be used by processor 134 to perform functions consistent with the present disclosure. For example, storage device 136 and/or memory 138 may store the source images to be stitched and the created panoramic images. As another example, storage device 136 and/or memory 138 may store computer instructions for performing the disclosed methods for adjusting the brightness during panorama creation.

Figure 3:
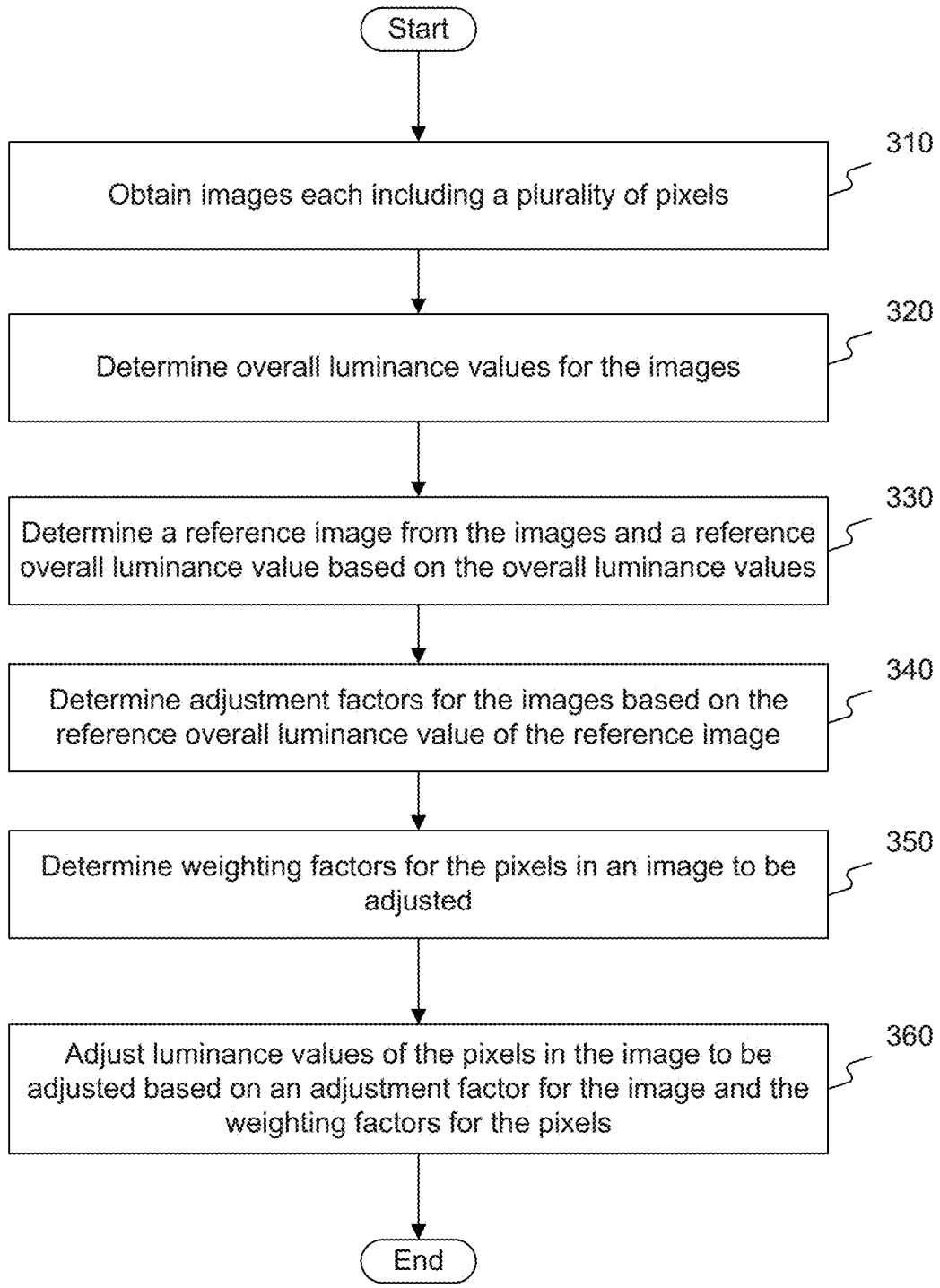
FIG. 3 is a flowchart of a method for adjusting brightness of a plurality of images, according to an exemplary embodiment.

FIG. 3 is a flowchart of a method 300 for adjusting brightness of a plurality of images, according to an exemplary embodiment. Method 300 may be performed by controller 130 (e.g., processor 134).

For example, in step 310, processor 134 may obtain n source images, each including a plurality of pixels, where n is a positive integer and n In some embodiments, processor 134 may sort the n source images in an order. Each of the ordered source images may partially overlap with its neighboring source images. For example, in the cases of n≥3, when i is an integer and n>i≥2, the ith source image may have a first region overlapping with at least part of the (i−1)th source image, and a second region overlapping with at least part of the (i+1)th source image. In addition, in 360-degree panorama creation, the nth source image may also overlap with the first source image. As described below in more detail, processor 134 may stitch the n source images by merging them at the overlapping regions.

In system 100 shown in FIG. 1, processor 134 may obtain eight source images $M_a$-$M_h$ and order them in the sequence of $M_a$, $M_b$, . . . , and $M_h$. Each source image may include two regions overlapping with two adjacent source images, respectively. Since $M_a$-$M_h$ jointly cover a 360-degree view and the first image $M_a$ and the last $M_h$ image partially overlap with each other, $M_a$ and $M_h$ are also considered as adjacent source images.

In step 320, processor 134 may determine overall brightness, that is, luminance values, for the n images. The overall luminance value for each image may be denoted as Po(i), where i=1, 2, . . . n. A method for determining the overall luminance value for each image is described below with reference to FIG. 4.

Figure 4:
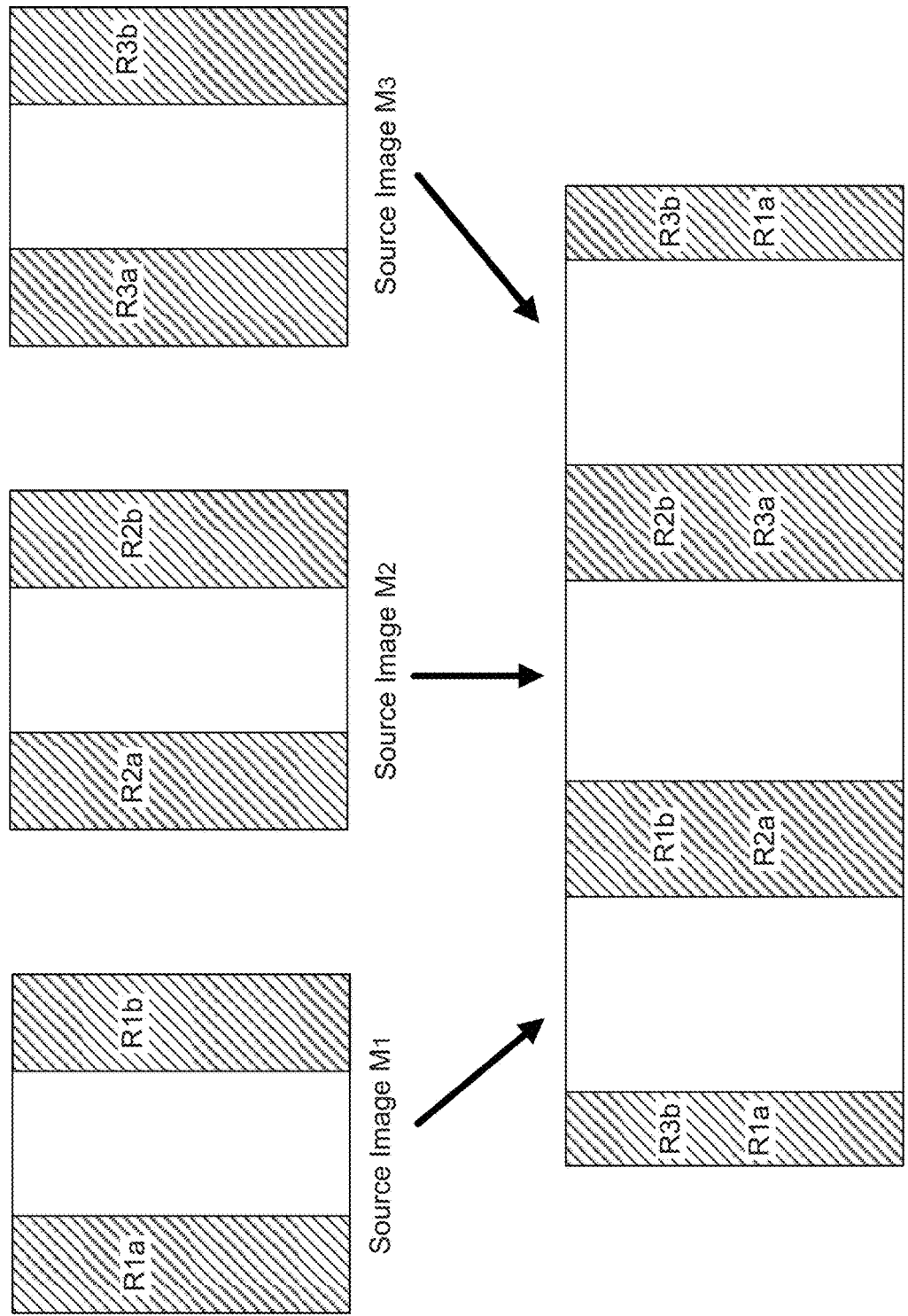
FIG. 4 is a schematic diagram illustrating a method of stitching a plurality of images, according to an exemplary embodiment.

FIG. 4 schematically illustrates a method of stitching a plurality of images. The method may be performed by controller 130 (e.g., processor 134). For illustrative purposes, FIG. 4 shows three source images, $M_1$, $M_2$, and $M_3$, although two or more than three images may be used for stitching to create a 360-degree panoramic image. In general, n images may be used for creating a 360-degree panoramic image, $M_1$, $M_2$, . . . $M_n$, where n is any positive integer greater than or equal to 2.

Each source image may include two regions that overlap with the two adjacent source images respectively. For example, region $R_{1b}$ of image $M_1$ may overlap with region $R_{2a}$ of image $M_2$, region $R_{2b}$ of image $M_2$ may overlap with region $R_{3a}$ of image $M_3$, and region $R_{3b}$ of image $M_3$ may overlap with region $R_{1a}$ of image $M_1$. Each of the six overlapping regions has a mean brightness (e.g., average luminance values of all pixels included in each region), denoted by $Y_{1a}$, $Y_{1b}$, $Y_{2a}$, $Y_{2b}$, $Y_{3a}$, and $Y_{3b}$, respectively. The overall luminance value Po(i) for an image $M_i$ may be determined based on the brightness of its two overlapping regions.

In some embodiments, the overall luminance value Po(i) of image $M_i$ may be determined based on a statistical value (e.g., average) of the luminance values of its two overlapping regions. For example, the overall luminance value Po(1) of image $M_1$ may be determined as the average value of $Y_{1a}$ and $Y_{1b}$. Likewise, the overall luminance value Po(2) of image $M_2$ may be determined as the average value of $Y_{2a}$ and $Y_{2b}$, and the overall luminance value Po(3) of image $M_3$ may be determined as the average value of $Y_{3a}$ and $Y_{3b}$.

In some embodiments, the overall luminance value Po(i) for image $M_i$ may be determined based on the luminance values of all of the pixels in image $M_i$. For example, the overall luminance value Po(i) for image $M_i$ may be the average or median value, or another statistical representation of the luminance values of all of the pixels included in image $M_i$.

Referring back to FIG. 3, in step 320, a plurality of overall luminance values Po(i) are determined for the n images, where i=1, 2, . . . n. Method 300 may further include step 330, in which processor 134 may determine a reference image from the plurality of images and a reference overall luminance value based on the n overall luminance values. Processor 134 may obtain a statistical value Ps based on the n overall luminance values of the images. For example, the statistical value Ps may be the average of the n overall luminance values Po(1), Po(2), . . . , Po(n). As another example, the statistical value Ps may be the median value of the n overall luminance values Po(1), Po(2), . . . , Po(n). Other statistical representations calculated based on Po(1), Po(2), . . . , Po(n) may also be used as Ps.

To illustrate the rest of method 300, in the discussion below, the median value of the n overall luminance values Po(1), Po(2), . . . , Po(n) is used as the statistical value Ps (hence Ps is also referred to as the median value Ps). Processor 134 may compare each overall luminance value Po(1), Po(2), . . . , Po(n) with the median value Ps to determine the kth value Po(k) that is closest to the median value Ps (e.g., the absolute difference between Po(k) and Ps is the smallest among all Po(i)). Processor 134 may select the kth value Po(k) as the reference overall luminance value, and select the corresponding image $M_k$ as the reference image. Before stitching the n images to create a panoramic image, the overall luminance values of the n images may be adjusted using the disclosed methods to ensure consistency across different images and consistency across different regions within an image.

In step 340 shown in FIG. 3, processor 134 may determine adjustment factors for the images based on the reference overall luminance value of the reference image. For example, processor 134 may divide the reference overall luminance value Po(k) by each of the n overall luminance values Po(1), Po(2), . . . , Po(n) to determine n adjustment factors f(1), f(2), . . . , f(k), . . . , f(n), where f(i)=Po(k)/Po(i), i=1, 2, . . . , k, . . . , n. Thus, the reference image has an adjustment factor of 1.0, which means the reference image does not need to be adjusted. For those images whose overall luminance values are smaller than the reference overall luminance value, the adjustment factors are greater than 1.0, which means the luminance values of those images will be increased. For those images whose overall luminance values are greater than the reference overall luminance value, the adjustment factors are smaller than 1.0, which means the luminance values of those images will be reduced or decreased.

In step 350 shown in FIG. 3, processor 134 may determine weighting factors for the pixels included in an image to be adjusted. The weighting factors for the pixels in the image to be adjusted may vary based on the luminance values of the pixels obtained before adjustment. Thus, for pixels having different luminance values before adjustment, the weighting factors for these pixels may be different. For example, for image $M_i$ to be adjusted, where i=1, 2, . . . , k−1, k+1, . . . , n, assuming the adjustment factor for image $M_i$ is f(i), processor 134 may determine a weighting factor for each pixel. The weighting factor for a pixel x may be a function of the luminance value of the pixel x (the luminance value being the luminance value before adjustment). The weighting factor may be denoted by W[I(x)], where I(x) denotes the luminance value of pixel x. For each image $M_i$, there may be N weighting factors W[I(x)], where N is the total number of pixels in image V, and x=1, 2, . . . , N. The luminance values I(x) of all pixels included in image $M_i$ may fall within a predetermined range, such as [0, Maxscale], where 0 may correspond to the darkest pixel, and Maxscale may correspond to the brightest pixel. Maxscale may be a predetermined maximum luminance value of all pixels in image $M_i$. For example, in one embodiment, Maxscale=255. Other suitable values may also be used for Maxscale.

The weighting factors W[I(x)] may monotonically change (e.g., increase or decrease) as a function of the luminance values I(x) of the pixels obtained before adjustment. For example, the weighting factors W[I(x)] may monotonically increase or decrease as the luminance values I(x) of the pixels obtained before adjustment vary within a predetermined range (e.g., from zero to a predetermined maximum luminance value, such as Maxscale).

In some embodiments, when the adjustment factor f(i) for the image $M_i$ to be adjusted is greater than a predetermined factor (e.g., f(i)>1.0), the weighting factors for the pixels may monotonically decrease within a predetermine range (e.g., from 1.0 to 0 or in other suitable ranges) as the luminance values I(x) of the pixels obtained before adjustment increase from zero to the predetermined maximum luminance value (e.g., Maxscale). When the adjustment factor f(i) for the image $M_i$ to be adjusted is less than a predetermined factor (e.g., f(i)<1.0), the weighting factors W[I(x)] for the pixels may monotonically increase within a predetermine range (e.g., from 1.0 to 0 or in other suitable ranges) as the luminance values I(x) of the pixels obtained before adjustment increase from zero to the predetermined maximum luminance value (e.g., Maxscale).

For example, the weighting factors W[I(x)] may be determined based on the following formula:

$$W[I(x)] = \begin{cases} \cos\left(\dfrac{\pi * I(x)}{2 * Maxscale}\right) & \text{when } f(i) > 1.0 \\ \cos\left(\dfrac{\pi * (Maxscale - I(x))}{2 * Maxscale}\right) & \text{when } f(i) < 1.0 \end{cases}$$

Although cosine functions cos( ) are used in the above formula as one embodiment to implement a monotonically increasing or decreasing weighting factor W[I(x)], other functions, such as linear function, sine, polynomial, and other variations of the cosine functions, may also be used. In addition, in some embodiments, the weighting factors W[I(x)] may increase or decrease nonlinearly, as the luminance value I(x) for the pixels increases or decreases within a predetermined range (e.g., [0, Maxscale]). In some embodiments, the weighting factor W[I(x)] may increase or decrease both linearly and nonlinearly piecewise as luminance value I(x) for the pixels increases or decreases within a predetermined range (e.g., [0, Maxscale]).

Figure 5A:
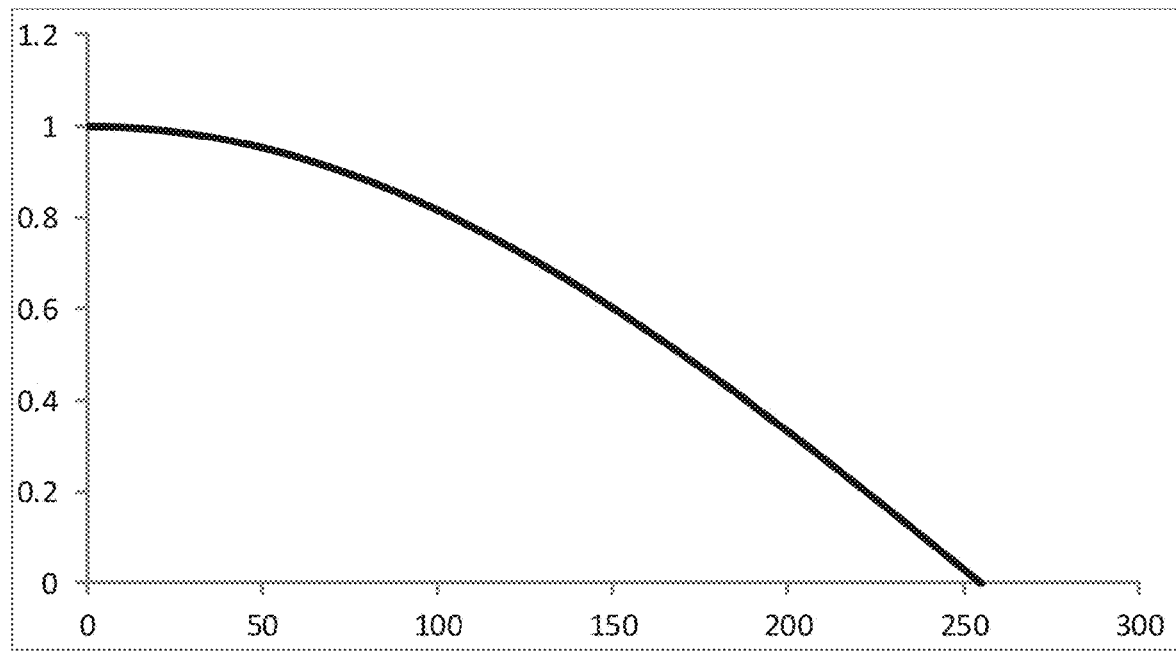
FIG. 5A is a plot showing a monotonically decreasing relationship between a weighting factor and the luminance values of the pixels, according to an exemplary embodiment.

FIG. 5A is a plot showing a monotonically decreasing relationship between the weighting factor W[I(x)] and the luminance values I(x) of the pixels according to the above formula for f(i)>1.0. The horizontal axis is the luminance value I(x) for the pixels, and the vertical axis is the weighting factor W[I(x)]. FIG. 5A shows that when the adjustment factor f(i) for the ith image $M_i$ is greater than 1.0, the weighting factor W[I(x)] monotonically decreases as the luminance value I(x) for the pixels increases from 0 to Maxscale (e.g., 255).

Figure 5B:
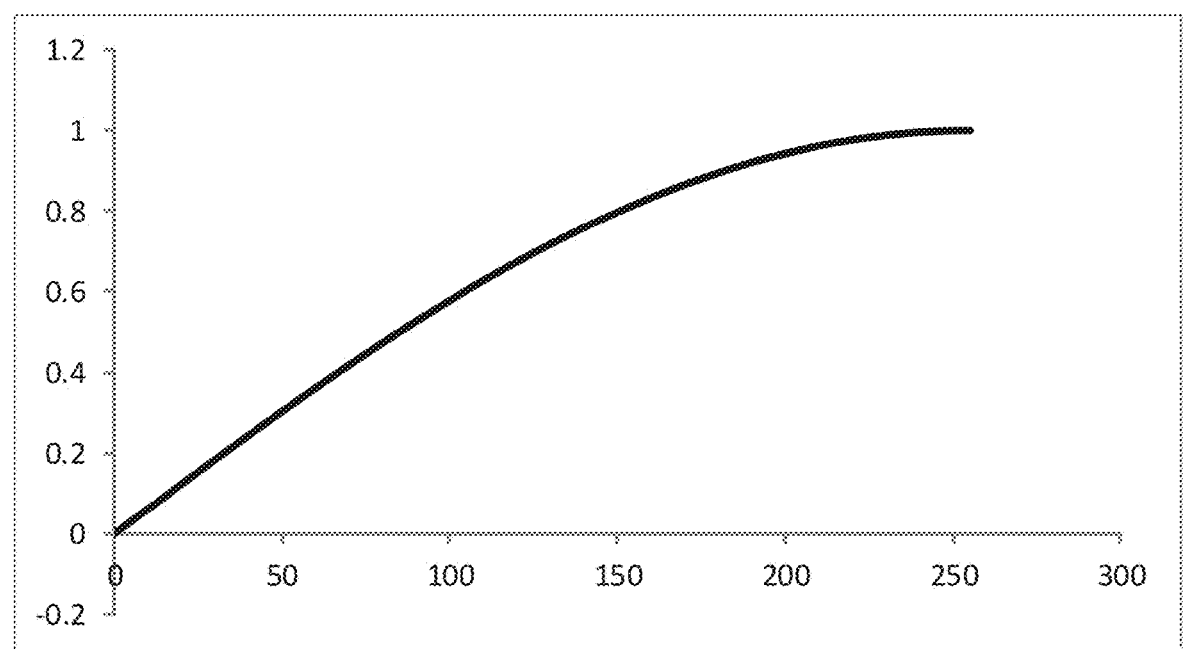
FIG. 5B is a plot showing a monotonically increasing relationship between a weighting factor and the luminance values of the pixels, according to an exemplary embodiment.

FIG. 5B is a plot showing a monotonically increasing relationship between the weighting factor W[I(x)] and the luminance values I(x) of the pixels according to the above formula for f(i)<1.0. The horizontal axis is the luminance value I(x) for the pixels, and the vertical axis is the weighting factor W[I(x)]. FIG. 5B shows that when the adjustment factor f(i) for the ith image $M_i$ is smaller than 1.0, the weighting factor W[I(x)] monotonically increases as the luminance value I(x) for the pixels increases from 0 to Maxscale (e.g., 255).

Referring back to FIG. 3, in step 360 processor 134 may adjust luminance values of the pixels in the image to be adjusted based on an adjustment factor for the image and the weighting factors for the pixels. For example, for the ith image $M_i$ to be adjusted, the adjustment factor for the image $M_i$ may be f(i), and the weighting factors W[I(x)] may be calculated based on the above formula for all of the pixels included in the image $M_i$. Processor 134 may determine a luminance adjustment amount value for each pixel x based on the adjustment factor f(i) determined for the image $M_i$, and a weighting factor W[I(x)] determined for the pixel x, where W[I(x)] is determined based on the luminance value I(x) of the pixel x obtained before adjustment.

For example, the luminance adjustment amount value for pixel x may be denoted as ΔI(x), and may be calculated from ΔI(x)=(f(i)−1)*W[I(x)]*I(x). In other words, the luminance adjustment amount value may be calculated based on the adjustment factor f(i) for image $M_i$, the weighting factor W[I(x)] for the pixel x, and the luminance value I(x) of pixel x obtained before adjustment. The luminance value of the pixel x after adjustment I'(x) may be determined from I'(x)=I(x)+ΔI(x).

Thus, when f(i)>1.0, then ΔI(x)>0, which means image $M_i$ is to be adjusted to increase its brightness. The weighting factor W[I(x)] monotonically decreases from 1.0 to 0 as I(x) increases from 0 to Maxscale, as shown in FIG. 5A. In other words, the adjusting factors W[I(x)] for brighter pixels (i.e., pixels with the luminance values closer to Maxscale) are smaller than the adjusting factors W[I(x)] for darker pixels (i.e., pixels with luminance values closer to 0). Accordingly, the luminance adjustment amount values for brighter pixels are smaller than the luminance adjustment amount values for darker pixels. As a result, over exposure to brighter pixels is prevented when the brightness of the image is increased during the adjustment.

When f(i)<1.0, then ΔI(x)<0, which means image $M_i$ is to be adjusted to reduce its brightness. The weighting factor W[I(x)] monotonically increases from 0 to 1.0 as I(x) increases from 0 to Maxscale, as shown in FIG. 5B. In other words, the adjusting factors W[I(x)] for darker pixels (i.e., pixels with the luminance values closer to 0) are smaller than the adjustment factors W[I(x)] for brighter pixels (i.e., pixels with luminance values closer to Maxscale). Accordingly, the luminance adjustment amount values for darker pixels are smaller than the luminance adjustment amount values for brighter pixels. As a result, under exposure to darker pixels is prevented when the brightness of the image is reduced during the adjustment.

According to the disclosed embodiments, for each pixel, the weighting factor W[I(x)] adjusts the adjustment factor f(i) that is determined for the entire image $M_i$. (f(i)−1)*W[I(x)] may be regarded as an effective adjustment factor. Because the weighting factor W[I(x)] is a function of the luminance value of each pixel, the effective adjustment factor (f(i)−1)*W[I(x)] may be different for different pixels having different brightness. In contrast, in a conventional brightness adjustment method, a single adjustment factor f(i) determined for the entire image is used for adjusting the brightness of every pixel, and the adjustment factor f(i) is not adjusted by a weighting factor W[I(x)] that varies based on the luminance value of each pixel. As a result, when a conventional method is used, over exposure can occur to the brighter regions in an image when the brightness of the image is increased using the single adjustment factor f(i), and under exposure can occur to the darker regions in the image when the brightness of the image is reduced using the single adjustment factor f(i). The disclosed methods can effectively prevent or significantly reduce over exposure and under exposure by using a weighting factor W[I(x)] that take into account the luminance value of each pixel to modify the adjustment factor f(i) determined for the entire image.

Figure 6A:
FIG. 6A shows an original image before being processed by a brightness adjustment method.
Figure 6B:
FIG. 6B shows the image of FIG. 6A after being processed by a conventional brightness adjustment method.

FIG. 6A shows an original image before being processed by a brightness adjustment method. FIG. 6B shows the image of FIG. 6A after being processed by a conventional brightness adjustment method that uses a single adjustment factor f(i) for adjusting the brightness of all pixels without using a weighting factor W[I(x)] that takes into account the brightness of each individual pixel. As shown in FIG. 6B, after the brightness of the original image is increased, over exposure occurred to the pixels in the window area (indicated by a dashed circle) in the image.

Figure 7:
FIG. 7 shows the image of FIG. 6A after the image has been processed using the disclosed brightness adjustment method.

FIG. 7 shows the image of FIG. 6A after the image has been processed using the disclosed brightness adjustment method. As discussed above, the disclosed method uses an effective adjustment factor (f(i)−1)*W[I(x)] for adjusting each individual pixel, and the effective adjustment factor varies based on the luminance value of each individual pixel obtained before adjustment. Thus, the effective adjustment factor takes into account the brightness of each individual pixel. Comparing FIGS. 6B and 7, it can be seen that with the disclosed method, the over exposure to the pixels in the window area (in FIG. 7) is significantly reduced or prevented.

Figure 8A:
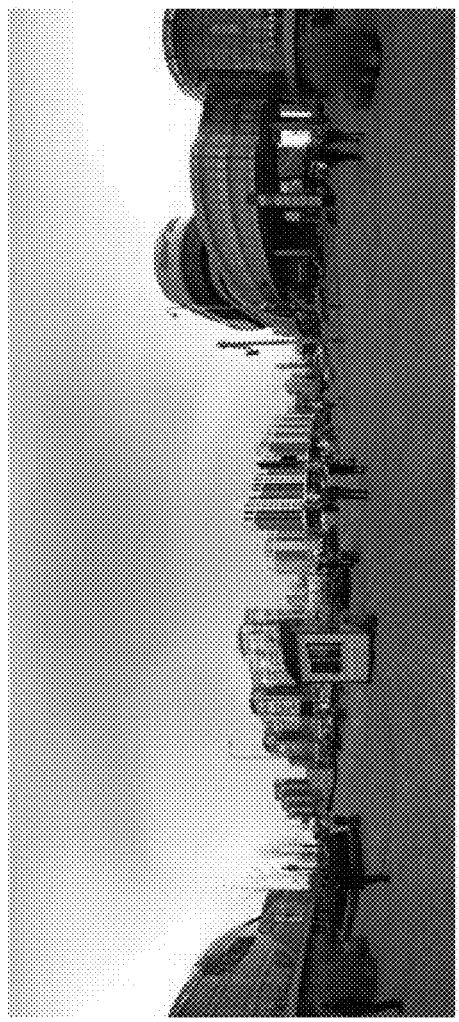
FIG. 8A shows an image that has been processed using a conventional method.
Figure 8B:
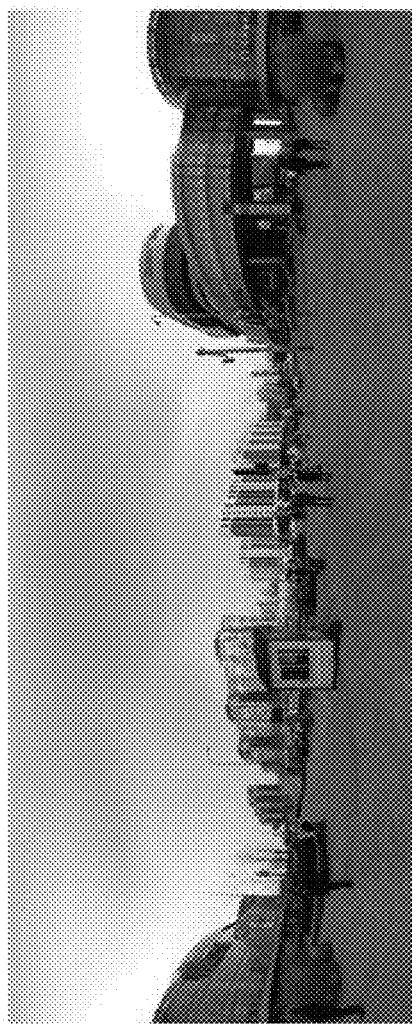
FIG. 8B shows the same source image as that of FIG. 8A that has been processed using the disclosed method.

FIG. 8A shows an image that has been processed using a conventional method. As shown in FIG. 8A, there is over exposure in the sky region and under exposure in the ground region. FIG. 8B shows the same source image as that of FIG. 8A that has been processed using the disclosed method. Comparing FIG. 8B with FIG. 8A, it can be seen that with the disclosed method for adjusting brightness, over exposure in the sky region and under exposure in the ground region have been reduced. The overall appearance of the image shown in FIG. 8B is more smooth as compared with the overall appearance of the image shown in FIG. 8A.

Referring back to FIG. 3, in some embodiments, method 300 may include additional steps. For example, after the brightness of the n images are adjusted, processor 134 may stitch the images to generate a combined image, such as a 360-degree panoramic image. This process is shown in FIG. 4. Specifically, in the example shown in FIG. 4, processor 134 stitches the images by merging them at the overlapping regions, e.g., merging $R_{1b}$ of image $M_1$ with $R_{2a}$ of image $M_2$, $R_{2b}$ of image $M_2$ with $R_{3a}$ of image $M_3$, and $R_{3b}$ of image $M_3$ with $R_{1a}$ of image $M_1$.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A device for adjusting brightness of a plurality of images each including a plurality of pixels, comprising:
   a memory configured to store instructions; and
   a processor configured to execute the instructions to:
      determine an overall luminance value of each of the plurality of images;
      determine a reference overall luminance value, among the overall luminance values of the plurality of images;
      determine a reference image, among the plurality of images, corresponding to the reference overall luminance value;
      determine adjustment factors for the images based on the reference overall luminance value of the reference image;
      determine weighting factors for the pixels in an image to be adjusted, the weighting factors varying based on luminance values of the pixels obtained before adjustment; and
      adjust the luminance values of the pixels in the image to be adjusted based on an adjustment factor for the image and the weighting factors for the pixels;
   wherein the weighting factors for the pixels in the image to be adjusted monotonically change as a function of the luminance values of the pixels obtained before adjustment;
   wherein the weighting factors monotonically change as the luminance values of the pixels obtained before adjustment vary within a range between zero and a predetermined maximum luminance value;
   wherein when the adjustment factor for the image to be adjusted is greater than a predetermined factor, the weighting factors for the pixels monotonically decrease within a predetermine range as the luminance values of the pixels obtained before adjustment increase from zero to the predetermined maximum luminance value; and
   wherein when the adjustment factor for the image to be adjusted is less than a predetermined factor, the weighting factors for the pixels monotonically increase within a predetermine range as the luminance values of the pixels obtained before adjustment increase from zero to the predetermined maximum luminance value.

2. The device of claim 1, wherein the processor is further configured to execute the instructions to, for the image to be adjusted:
   determine luminance adjustment amount values for pixels of the image based on:
      the adjustment factor determined for the image; and
      the weighting factors determined for the pixels; and
   adjust the luminance values of the pixels based on the luminance adjustment amount values.

3. The device of claim 1, wherein the processor is further configured to execute the instructions to:
   after adjusting the luminance values of the pixels in the images, stitch the images to obtain a combined image.

4. The device of claim 3, wherein the combined image is a 360-degree panoramic view.

5. The device of claim 1, wherein the processor is further configured to execute the instructions to:
   obtain a statistical value based on the overall luminance values of the plurality of images; and compare each of the overall luminance values with the statistical value to determine an overall luminance value closest to the statistical value as the reference overall luminance value.

6. The device of claim 5, wherein the statistical value is an average of the overall luminance values of the plurality of images; or
the statistical value is a median value of the overall luminance values of the plurality of images.

7. The device of claim 1, wherein the overall luminance value of each of the plurality of images is determined based on luminance values of all of the plurality of pixels in the each image.

8. A method for adjusting brightness of a plurality of images each including a plurality of pixels, comprising:
determining an overall luminance value of each of the plurality of images;
determining a reference overall luminance value, among the overall luminance values of the plurality of images;
determining a reference image, among the plurality of images, corresponding to the reference overall luminance value;
determining adjustment factors for the images based on the reference overall luminance value of the reference image;
determining weighting factors for the pixels in an image to be adjusted, the weighting factors varying based on luminance values of the pixels obtained before adjustment; and
adjusting the luminance values of the pixels in the image to be adjusted based on an adjustment factor for the image and the weighting factors for the pixels;
wherein the weighting factors for the pixels in the image to be adjusted monotonically change as a function of the luminance values of the pixels obtained before adjustment;
wherein the weighting factors monotonically change as the luminance values of the pixels obtained before adjustment vary within a range between zero and a predetermined maximum luminance value;
wherein when the adjustment factor for the image to be adjusted is greater than a predetermined factor, the weighting factors for the pixels monotonically decrease within a predetermine range as the luminance values of the pixels obtained before adjustment increase from zero to the predetermined maximum luminance value; and
wherein when the adjustment factor for the image to be adjusted is less than a predetermined factor, the weighting factors for the pixels monotonically increase within a predetermine range as the luminance values of the pixels obtained before adjustment increase from zero to the predetermined maximum luminance value.

9. The method of claim 8, further comprising:
for the image to be adjusted,
determining luminance adjustment amount values for pixels of the image based on:
the adjustment factor determined for the image; and
the weighting factors determined for the pixels; and
adjusting the luminance values of the pixels based on the luminance adjustment amount values.

10. The method of claim 8, further comprising:
after adjusting the luminance values of the pixels in the images, stitching the images to obtain a combined image.

11. The method of claim 10, wherein the combined images is a 360-degree panoramic view.

12. The method of claim 8, wherein determining a reference overall luminance value among the overall luminance values of the plurality of images comprises:
obtaining a statistical value based on the overall luminance values of the plurality of images; and
comparing each of the overall luminance values with the statistical value to determine an overall luminance value closest to the statistical value as the reference overall luminance value.

13. The method of claim 12, wherein the statistical value is an average of the overall luminance values of the plurality of images; or
the statistical value is a median value of the overall luminance values of the plurality of images.

14. The method of claim 8, wherein the overall luminance value of each of the plurality of images is determined based on luminance values of all of the plurality of pixels in the each image.

15. A non-transitory computer-readable storage medium storing instructions that, when executed by a processor, cause the processor to perform a method for adjusting brightness of a plurality of images each including a plurality of pixels, the method comprising:
determining an overall luminance value of each of the plurality of images;
determining a reference overall luminance value, among the overall luminance values of the plurality of images;
determining a reference image, among the plurality of images, corresponding to the reference overall luminance value;
determining adjustment factors for the images based on the reference overall luminance value of the reference image;
determining weighting factors for the pixels in an image to be adjusted, the weighting factors varying based on luminance values of the pixels obtained before adjustment; and
adjusting luminance values of the pixels in the image to be adjusted based on an adjustment factor for the image and the weighting factors for the pixels;
wherein the weighting factors for the pixels in the image to be adjusted monotonically change as a function of the luminance values of the pixels obtained before adjustment;
wherein the weighting factors monotonically change as the luminance values of the pixels obtained before adjustment vary within a range between zero and a predetermined maximum luminance value;
wherein when the adjustment factor for the image to be adjusted is greater than a predetermined factor, the weighting factors for the pixels monotonically decrease within a predetermine range as the luminance values of the pixels obtained before adjustment increase from zero to the predetermined maximum luminance value; and
wherein when the adjustment factor for the image to be adjusted is less than a predetermined factor, the weighting factors for the pixels monotonically increase within a predetermine range as the luminance values of the pixels obtained before adjustment increase from zero to the predetermined maximum luminance value.

16. The non-transitory computer-readable storage medium of claim 15, wherein determining a reference overall luminance value among the overall luminance values of the plurality of images comprises:
obtaining a statistical value based on the overall luminance values of the plurality of images; and comparing each of the overall luminance values with the statistical value to determine an overall luminance value closest to the statistical value as the reference overall luminance value.

17. The non-transitory computer-readable storage medium of claim 16, wherein the statistical value is an average of the overall luminance values of the plurality of images; or the statistical value is a median value of the overall luminance values of the plurality of images.

18. The non-transitory computer-readable storage medium of claim 15, wherein the overall luminance value of each of the plurality of images is determined based on luminance values of all of the plurality of pixels in the each image.

* * * * *